June 16, 1936.  E. E. WEMP  2,044,487
CENTRIFUGAL CLUTCH
Filed May 25, 1933  3 Sheets-Sheet 1
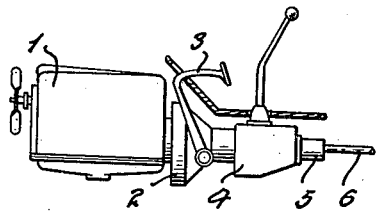
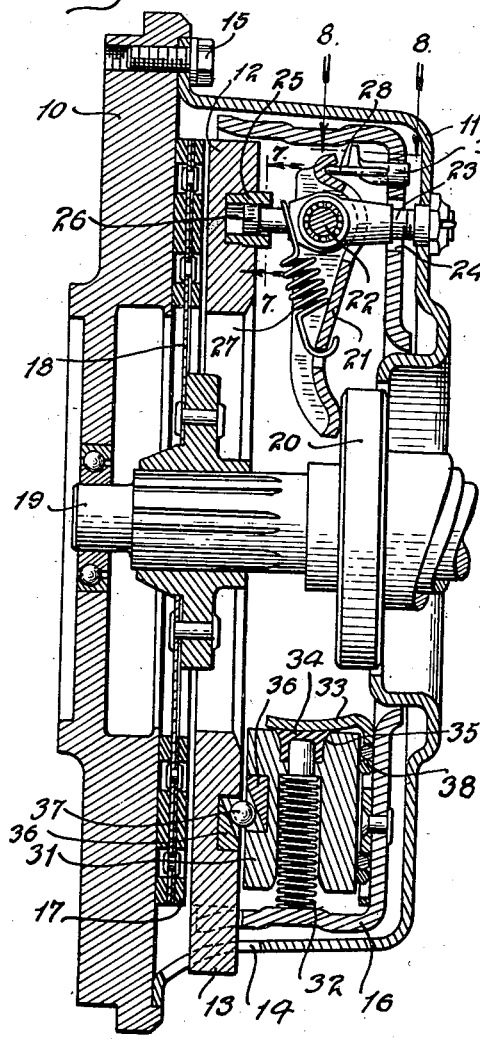
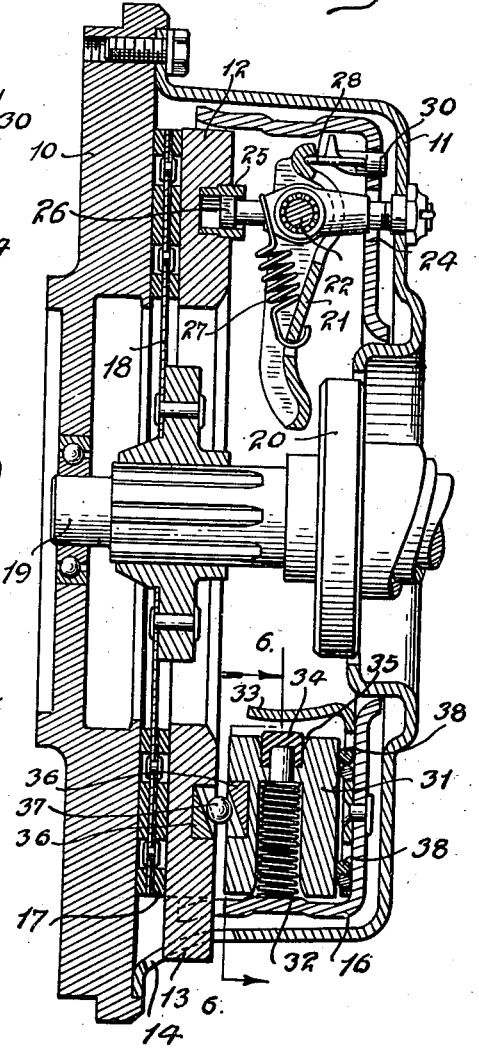
INVENTOR.
ERNEST E. WEMP.
BY
Barnes, Kisselle & Laughlin
ATTORNEYS.

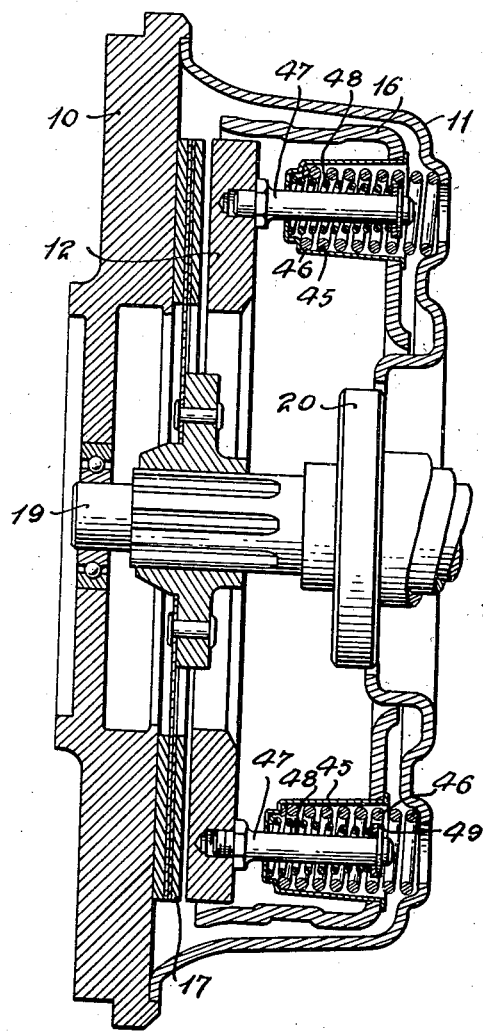
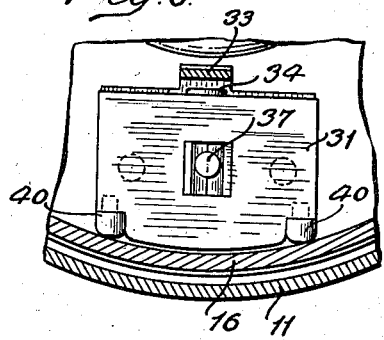
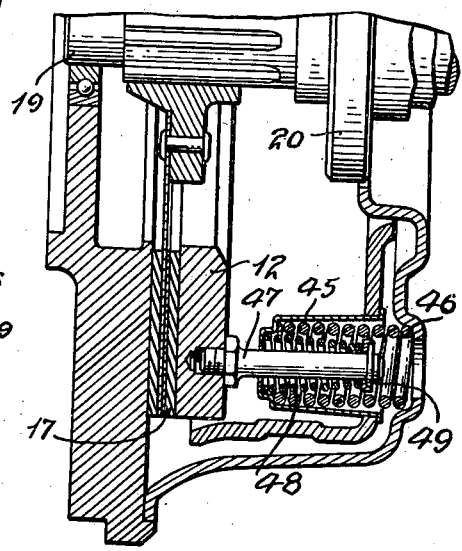
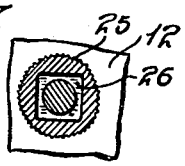
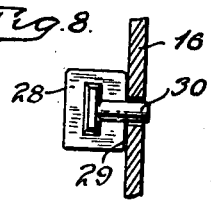

June 16, 1936.  E. E. WEMP  2,044,487
CENTRIFUGAL CLUTCH
Filed May 25, 1933  3 Sheets-Sheet 3

INVENTOR.
ERNEST E. WEMP.
BY
Barnes, Kisselle & Laughlin
ATTORNEYS.

Patented June 16, 1936

2,044,487

UNITED STATES PATENT OFFICE 2,044,487

CENTRIFUGAL CLUTCH

Ernest E. Wemp, Detroit, Mich.

Application May 25, 1933, Serial No. 672,793

8 Claims. (Cl. 192—105)

This invention relates to a centrifugal clutch structure, particularly adapted for use in automotive vehicles utilizing internal combustion engines, but which obviously is not limited to such use. The invention aims to provide an improved structure embodying various features of novelty for obtaining a nicety action, a substantially silent action, and an arrangement insuring proper functioning of the clutch even in the event of warpage in some of the parts incident to temperature changes experienced by the clutch in operation. A clutch of this general type is covered in my application No. 607,065, filed April 23, 1932.

The invention further contemplates novel arrangement of clutch operating levers, centrifugal weights, packing springs, and springs acting against centrifugal action by which these necessary parts are arranged in an annular formation within the limited space afforded in a clutch of normal size.

Other features and objects of the invention will become apparent as the detailed description progresses in connection with the accompanying drawings.

Fig. 1 is a more or less diagrammatic illustration showing one environment of the clutch in an automotive vehicle.

Fig. 2 is a sectional view taken through the clutch in disengaged condition, the section being taken substantially on line 2—2 of Fig. 9.

Fig. 3 is a sectional view similar to Fig. 2 showing the clutch in engaged condition.

Fig. 4 is a sectional view taken through the clutch in open condition showing the packing spring arrangement and also showing the springs working against centrifugal action, the view being taken substantially on line 4—4 of Fig. 9.

Fig. 5 is a partial sectional view similar to Fig. 4 showing the parts in clutch engaged condition.

Fig. 6 is a view showing a centrifugal weight member taken substantially on line 6—6 of Fig. 3.

Fig. 7 is a sectional view taken substantially on line 7—7 of Fig. 2.

Fig. 8 is a view taken substantially on line 8—8 of Fig. 2 showing in detail a lever fulcrum member.

Figure 9:
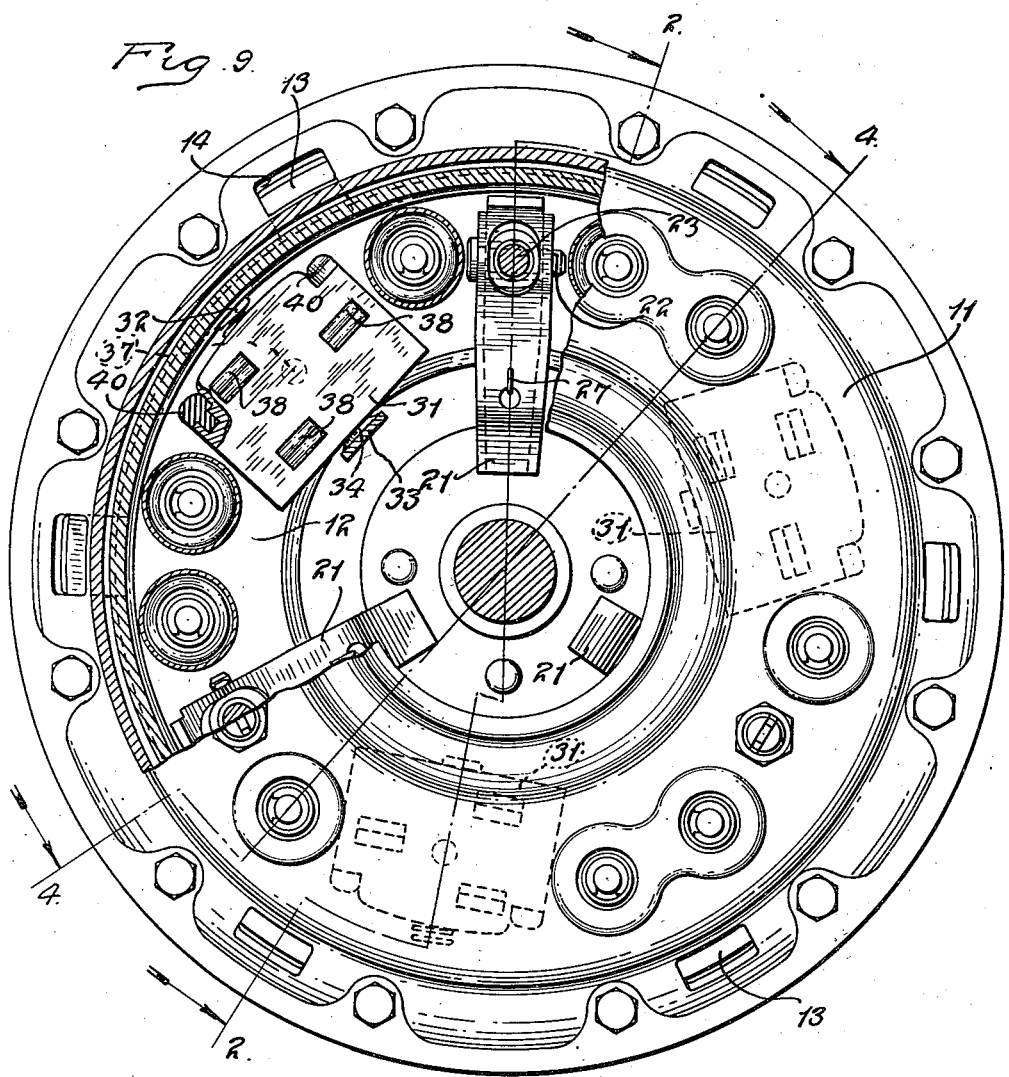
Fig. 9 is a rear view of a clutch member with some parts cut away and some parts in section showing the arrangement of the weights, springs, and levers, etc.
Figure 10:
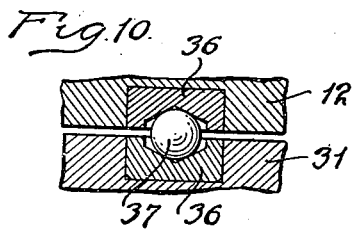
Fig. 10 is a sectional view taken through a pocketed ball member which functions in the engagement and disengagement of the clutch incident to centrifugal action.

In Fig. 1 there is illustrated an internal combustion engine 1, a clutch housing 2, a clutch controlling lever 3, a gear shift transmission case 4, and a free wheeling or overrunning unit 5 positioned between the transmission and a driving shaft 6. The present clutch structure is particularly adapted to be used in such an arrangement wherein there is a one-way drive coupling to permit the driving shaft 6 to overrun the engine and clutch and, as is well-known to those versed in the art of automotive vehicles, this is commonly termed "free wheeling." Details of the free wheeling unit and the other parts need not be described as these are all well-known and may take any one of various forms. Where the clutch is to be used with an internal combustion engine in an automotive vehicle, one driving member may be an engine flywheel 10 to which is attached a clutch cover plate 11. Another driving member may take the form of a pressure ring or pressure plate 12 associated in driving relation with the member 10. Advantageously so far as the present construction is concerned, this pressure ring 12 may have projecting driving lugs 13 located in milled slots 14 in the cover plate. Since the cover plate is secured to the flywheel 10 in the usual manner, as for example, by cap screws 15, these three parts are connected for rotation in unison. The arrangement permits, however, of axial movement of the pressure ring 12 relative to the flywheel and cover plate on account of the elongated formation of the slots 14.

Within the cover plate there is a member which advantageously is termed a back plate 16 and which may be of annular formation and generally of L-shape in cross section as shown. This member may be tied to rotate in unison with the clutch driving parts by having milled slots 17 fitted over the projections 13 of the pressure ring. The driven member of the clutch may comprise the usual driven disc 18 with clutch facing material thereon, as shown, splined to a driven shaft 19. Slidably mounted upon the driven shaft may be a clutch throw-out member 20 which is reciprocable by the lever 3.

Clutch throw-out levers are provided, and there are preferably three of such levers as illustrated in Fig. 9. These levers are shown at 21 and each is pivoted as at 22 on a stud 23 each carried by the cover plate, and extending through an opening 24 on the back plate. To stabilize the studs a bushing 25 may be pressed into the pressure ring and one end of each stud is reciprocably carried by a bushing. The end of the stud may be squared as at 26 (Fig. 7) or may be of any other out of round shape. This keeps the studs from rotating. A coil spring 28 may be hooked over each lever and its stud for anti-rattling purposes. In operation, the levers may fulcrum upon inserted fulcrum members 28 which are disposed between the ends of the levers and the adjacent part of the back plate as at 29 (Fig. 8). These members may have projecting parts 30 fitted into apertures in the back plate as shown.

The member 16 may carry or support centrifugal weight members. These weight members are illustrated at 31 and each is held normally radially inwardly by a coil spring 32 located in a bore or aperture in the weight and reacting against the plate 16. A suitable bracket like member 33 may limit the inward movement of each weight. Preferably rubber bumper means are provided for taking the contact and blow between the weights and the brackets 33. A rubber button or block may be located in a recess advantageously disposed in alignment with the recess for the spring 32 and the walls of which are preferably divergent, as at 35, to provide room for rubber flow. Fig. 2 shows how the rubber may flow into the recess when the clutch is disengaged and this showing being probably somewhat exaggerated; and Fig. 3 shows substantially its normal condition.

Inclined plane means is associated with each weight for shifting the pressure ring. This preferably takes the form of a recess in each weight positioned centrally of one face, and a matching recess in the pressure ring. Steel inserts 36 may be located in the recess. These inserts have inclined walls and pocketed between them is a ball 37. Preferably there is only one ball and its pocketing recesses between each weight and the pressure ring. Accordingly, this provides a three-point mounting or backing for the pressure ring where three weights are used as shown in Fig. 9. Anti-friction bearings are preferably provided for backing up the weights. These, as shown in Figs. 2 and 3, may comprise rollers 38 located in cutaway portions of the brackets 33. As it will be noted by reference to Fig. 9, there are preferably three sets or units of these rollers, thus giving the weights each a three-point backing against the back plate. Rubber bumpers are preferably provided for taking the blow and contact between the weights and the rim portion of the back plate 16. These may comprise rubber buttons or plugs 40 positioned so as to contact with the annular and inwardly raised portion in the peripheral part of the back plate 16 and as clearly shown in Figs. 2 and 3.

By reference to Fig. 9 it will be noted how the three levers 21 and the three centrifugal weights 31 are arranged. This provides for an arrangement for the springs in which there is a single spring assembly on one side of each lever and a double spring assembly on the other side of each lever. The arrangement of the springs will be noted by reference to Figs. 4 and 5. The back plate may be apertured for the reception of the cups 45 and a clutch packing spring 46 is disposed in each cup so as to act on the back plate with the spring reacting against the cover plate. The bottoms of the cups are apertured and studs 47 screw threaded into the pressure ring extend into the cups, and coil springs advantageously of tapered formation, as shown at 48, are disposed between the bottoms of the cups and washers or the like 49 on the ends of the studs. The springs 48 act against centrifugal action while the springs 46 are the usual clutch packing springs. The cups may be shaped in their bottom portion to provide two spring supporting surfaces as illustrated.

The operation is as follows: the clutch is designed to be normally engaged and disengaged by centrifugal action. The arrangement is preferably such that at the normal idling speed of the engine, say from four to five hundred R. P. M., the clutch is open as illustrated in Fig. 2. This means that the force of the spring 32 for each weight combined with the force of the pressure ring retracting springs 48 is great enough to overcome the centrifugal force and hold the weights radially inward as shown in Fig. 2. As soon as the engine is accelerated, however, the centrifugal weights shift radially outwardly to a position as illustrated in Fig. 2. It will be appreciated how the inclined surfaces of the insert members 36 thus move relative to each other, and through the anti-friction ball, cause the pressure ring and the weights to separate axially. This forces the pressure ring up against the driven member of the clutch so that it is packed between the flywheel and the pressure ring 12. Continued radial outward movement of the weights then causes the back plate to shift axially toward the cover plate thus compressing the clutch packing springs 46. As the back plate shifts to the right, as Figs 2 and 3 are viewed, the clutch releasing levers 21 may rock from a position as illustrated in Fig. 2 to a position as illustrated in Fig. 3. When the R. P. M., upon deceleration, reaches engine idling speed or thereabouts, the springs return the weights to the Fig. 2 position; the back plate moves forwardly under the action of the clutch packing springs until such time as this forward movement is prevented by reason of the ends of the levers 21 striking the clutch throwout members 20, which, as is understood by those skilled in the art, is not capable of movement to the right as Figs. 2 and 3 are viewed. At the same time the springs 48 are effective for retracting the pressure ring 12 to release the clutch. These springs 48, through the wedging action obtained by the ball and inclined plane means, also tend to shift the weights 31 to clutch disengaged position, but the inclined plane means sets up a mechanical disadvantage. This is one of the reasons why the springs 32 are provided. It will be readily seen therefore how the clutch engages and disengages upon acceleration and deceleration of the engine at speeds above the normal idling speed. At the same time the clutch may be manually disengaged at will. This is done while the parts are in the position shown in Fig. 3 and by means of depressing the lever 3. Now, of course, any time the engine comes down to idling speed the clutch opens and in the absence of any other means the clutch remains open when the engine is completely stopped. It may be pointed out, however, that this clutch may advantageously be used with an arrangement as shown in my application No. 607,064, filed April 23, 1932, for automatically re-engaging the clutch when the engine comes to a stop.

It is known that clutch parts are subject to what may be termed warpage, due no doubt to the heat to which the parts are submitted. Slippage of the clutch may cause much of the heat that sets up this difficulty. However, it will be noted that the pressure ring is backed up by a three-point contact with each point being furnished by one of the balls 37. This gives the pressure ring a tripodal support. Therefore, even though there be some warpage each of these three points are effective upon the pressure plate with substantially the same pressure. To bring this out more clearly, reference might be made to a four-point mounting of any object where there is any shrinkage, expansion, or warpage; one of the four points might be rendered ineffective. Likewise, each centrifugal weight is backed up through a three-point mounting by the antifriction rolls 38 working on the back plate. Thus there is no chance of wabble or loose play as the pressure ring backs up solidly against the weights through the means of the three-point mounting and each weight backs up solidly against the back plate by the three-point mounting for each weight. A silent operation is provided largely by reason of the rubber bumpers which provide the contact and take the blow when the weights move radially inward and outward.

Clutches for automotive vehicles of necessity must be limited in overall diameter else the casing 2, as illustrated in Fig. 1, will not have sufficient clearance with respect to the ground. This is particularly true at the present time when every tendency is to lower the center of gravity of automobiles. Accordingly, a special arrangement has been devised in order to get the levers, springs, and weights into a limited space. This special arrangement comprises arranging the elements in annular formation as shown in Fig. 9. In this arrangement the three levers are equally spaced with respect to each other, and the weights are equally spaced with respect to each other, but the levers on the one hand are not equally spaced as regards the weights on the other hand. This divides up the space so that two spring assemblies and one spring assembly occur alternately around the annulus. While this spring arrangement at first appears to be uneven, yet it will be apparent with little study that there is a uniform spring pressure provided on the pressure ring.

I claim:

1. A centrifugal clutch comprising in combination, driving and driven members, one of the driving members being axially shiftable for engaging and releasing the clutch, centrifugal weights for shifting said driving member, packing springs for providing the clutch packing pressure and levers for operating the shiftable driving member, said weights, packing springs, and levers being circularly arranged with the springs arranged alternately in a group of two springs and a single spring.

2. A centrifugal clutch comprising driving and driven members, the driving member being shiftable axially for clutch engagement and disengagement, three radially shiftable centrifugal weight members arranged to axially shift the said driving member, three clutch release levers for manual operation and a plurality of clutch packing springs which are flexed when the clutch is engaged, said levers, weights, and springs being circularly arranged, the levers being equally spaced as regards each other, the weights being equally spaced as regards each other, and the springs being located in spaces between the levers and weights with the springs alternately arranged thus: a plurality of springs in one space and a single spring in the next space and so on.

3. A centrifugal clutch comprising driving and driven members, one of the driving members being shiftable axially for clutch engagement and disengagement, three radially shiftable centrifugal weight members arranged to axially shift the said driving member, three clutch release levers for manual operation and a plurality of clutch packing springs which are flexed when the clutch is engaged, said levers, weights, and springs being arranged circularly, the levers being equally spaced as regards each other, the weights being equally spaced as regards each other, and the springs being located in spaces between the levers and weights with the springs alternately arranged thus: a pair of springs in one space and a single spring in the next space and so on, the weights and levers being irregularly circumferentially spaced as regards each other.

4. In a centrifugal clutch, clutch driving members one of which is axially shiftable, a clutch driven member adapted to be packed between the driving members, a back plate, coiled packing springs acting upon the back plate, centrifugally movable elements between the shiftable driving member and back plate for moving the shiftable driving member to clutch engaged position with the pressure provided by the pressure springs reacting against the back plate, studs secured to the shiftable driving member and projecting into the packing springs and coil springs telescoping with the packing springs and acting upon the studs and tending to retract the shiftable driving member against the centrifugal action of the elements.

5. In a centrifugal clutch, an axially shiftable driving member, an axially shiftable back plate, clutch packing springs tending to shift the back plate toward the driving member, another set of springs weaker than the packing springs arranged in telescoping relation with the packing springs, studs secured to the driving member and acted upon by the second set of springs serving to retract the driving member toward the back plate, and centrifugally movable weights and motion translating means positioned between the back plate and driving member.

6. In a centrifugal clutch, an annular back plate L-shaped in cross section, bracket members secured to the back plate each having an axially extending portion spaced inwardly from the peripheral portion of the back plate, a centrifugal weight positioned between the axially extending portion of each bracket and the peripheral portion of the back plate and arranged to shift radially therebetween, each weight having a radially extending bore therein and a coil spring in the bore reacting against the peripheral portion of the back plate and normally holding the weight against the axially extending portion of the bracket.

7. In a centrifugal clutch, an annular back plate L-shaped in cross section, bracket members secured to the back plate having axially extending portions spaced inwardly from the peripheral portion of the back plate, a centrifugal weight positioned between the axially extending portion of each bracket and the peripheral portion of the back plate and arranged to shift radially therebetween, said weights each having a radially extending bore therein and a coil spring in the bore reacting against the peripheral portion of the back plate and normally holding the weight against the axially extending portion of the bracket, and rubber bumpers carried by each weight for contacting with and taking the blow of the weight against the peripheral portion of the back plate and the axially extending portion of the bracket.

8. In a centrifugal clutch, an axially shiftable driving member, a cover plate, a spring pressed back plate between the cover plate and the driving member, centrifugally controlled weights and motion translating means between the driving member and back plate, clutch releasing levers, and a stud upon which each lever is mounted fixedly secured to the cover plate at one end and slidably mounted at the opposite end in the shiftable driving member and extending freely through the back plate.

ERNEST E. WEMP.